United States Patent Office 2,695,838
Patented Nov. 30, 1954

2,695,838

PROCESS FOR RECOVERY OF RESINS, WAXES, AND OILS FROM PEAT

Ernest J. Schabelitz, Rincon, Calif., assignor to Schabelitz Biochemical Corporation, San Diego, Calif., a corporation of California No Drawing. Application October 6, 1948,
Serial No. 53,147

2 Claims. (Cl. 44—32)

This invention relates generally to the treatment of peat to obtain therefrom the resins, waxes and oils which become valuable commercial products for chemical, pharmaceutical, cosmetic and dye uses. The present application is a continuation-in-part of my co-pending application S. N. 20,089 filed April 9, 1948, now Patent 2,453,543 issued on November 9, 1948, which is a continuation-in-part of my earlier application S. N. 699,591 filed September 26, 1946, now abandoned.

Some peats, such as those found occurring naturally in Great Britain and Pennsylvania, are of particular value in connection with the present process in that they contain a relatively high percentage of valuable waxes of the montan type in addition to various resins and oils normally found in bituminous coals.

It has previously been proposed to remove resins, waxes and oils from peat by various processes involving the use of a number of solvents. Thus, it has been proposed to remove peat wax from peat by the use of benzene solvents (Petroleum—for April 1948, pages 77–82 inclusive; Ester Waxes from British Peat by C. M. Cawley). The ordinary solvent extraction of peat wax from peat by the use of benzol or alcohol has resulted in the extraction of a black wax which has been used as a substitute for montan wax in polishes and the like. However, solvent extraction processes of this type generally involve considerable expense and have not proved either commercially practicable or economically sound.

Having in mind the various prior art difficulties in removing products from peat, I have made the discovery that an unexpectedly high percentage of valuable resins, waxes and oils, particularly montan waxes and fractions of unusually low boiling points, may be recovered in a state of high purity by solvent-treating peat at normal atmospheric temperatures and pressures for relatively brief periods of time, and at the same time my discovery makes it possible to produce a peat product which is especially suitable for use as an industrial and domestic fuel.

Accordingly, it is an object of my invention to extract the numerous valuable resins, waxes and oils naturally occurring in peat particularly to obtain a high yield of montan wax from peat deposits, particularly from those of the type found in Great Britain and Pennsylvania.

Another object of the present invention is to provide a process for removing resins, waxes and oils from peat which will be efficient and commercially practicable and will not require the use of excess temperatures or pressures and, additionally, will not require the use of numerous expensive solvents and which will not require an extended number of solvent reactions or an extended period of time.

Yet another object of the present invention is to provide a process for the treatment of peats which are generally unsatisfactory for commercial use in their natural occurring form so that the treated peat and the recovered by-products will be available in commercially useful and valuable form.

Still another object of my invention is to provide a process for treating peat whereby the constituents which deleteriously affect the peat for fuel purposes may be removed as useful and valuable by-products, while at the same time rendering the treated peat especially useful for fuel purposes.

In general, the present invention comprises the treatment of peat with ethylene dichloride at atmospheric temperatures and pressures for moderately brief periods of time, and by virtue of this extraction the soluble products are leached from the peat, following which the ethylene dichloride is recovered by centrifuging and the extracted resins, waxes and oils are then separated by fractional distillation into the desired number of their products, the resultant peat preferably being further deprived of ethylene dichloride and thereafter compressed into briquettes by conventional methods for use as domestic and industrial fuel.

Thus, this invention is distinguished from processes heretofore known where it was sought to extract the peat with solvents for a long period of time with or without further extraction to remove as many of the soluble constituents as possible, elevated temperatures approaching the boiling point of the solvents or above being used if required to effect maximum or other extensive extraction.

Considering the treatment of the described peats, the ordinary dark brown amorphous, soil-like peat may be immersed and leached in a quantity of ethylene dichoride without being subjected to a special grinding or powdering operation. Both the peat and the ethylene dichloride solvent are preferably unheated, that is, in no instance, in accordance with this invention, are they raised above ordinary normal temperatures or summer heat temperatures such as around 70 deg. F. to 110 deg. F. For efficient operation of the process, operations ordinarily are carried on simply at the prevailing atmospheric temperatures, and they are likewise carried on at atmospheric pressures. Thus, if the temperature is around the average normal temperature of 60 deg. F., 70 deg. F., or 80 deg. F., the peat and the solvent are both employed at such a temperature. If the temperature drops to freezing, the process is still usually carried on at the prevailing atmospheric temperature. Excellent results have been accomplished, for example, where the atmospheric temperature was about 15 deg. F., the immersion period being only in the neighborhood of 2 to 3 hours. However, the ethylene dichloride might then also come from ordinary storage where it could have a somewhat greater temperature, that is, anywhere up to perhaps 60 deg. F. or 70 deg. F., but any other ordinary temperature as above indicated, such as summer heat temperature, might be used for the solvent. Possibly, if both the peat and the solvent were at a low temperature, such as the mentioned 15 deg. F., it would require extending the time somewhat beyond three hours, depending upon the particular peat formation. Thus, I have obtained complete extraction with some peat formations in periods varying from 1½ to 4 hours' time.

From the standpoint of operations at normal temperatures, as above indicated, another very important factor is the convenience of operating at atmospheric pressure. While it is within the scope of this invention to employ elevated pressures, if desired, no important advantage is obtained, and if elevated pressures are employed, the economy of operating at atmospheric pressures is lost. Similarly, if it is desired to keep the ethylene dichloride at average normal temperatures, for example, between about 60 deg. F. and about 80 deg. F., when the atmospheric temperature is lower, the solvent may be correspondingly warmed, but again the economy of operating at the existing atmospheric temperature is lost.

Various ramifications of the process within the limits above indicated may be employed accordingly as operating conditions may indicate to be desirable. For example, batch operation effected by soaking the peat in an adequate amount of ethylene dichloride sufficient at least to immerse the peat may be employed, the soaking continuing for the required time interval as above indicated, with recycling of the solution, if desired. Again, the operation may be continuous, and this probably will be most economical in nearly all installations, especially large installations. If desired, for any particular purpose, combinations of batch and continuous operation may be used. In the case of continuous operation, the peat may be passed by mechanical conveyors from one end of a long tank to another at such a rate as to provide the required extraction. In such a case the ethylene dichloride solvent itself may be supplied in batches, peat being passed therethrough until any desired concentration of extracted resins, waxes, oils and other soluble constituents of the peat is attained, whereupon a fresh batch of the solvent will be introduced after running off the "rich" solution. In any event, the treated peat preferably is given a final rinse with fresh or "lean" ethylene dichloride. On the other hand, where mechanical conveyors are employed for moving the peat through an elongated tank, fresh or "lean" ethylene dichloride may, if preferred, be continuously introduced at the discharge end of the tank, and the "rich" ethylene dichloride solution withdrawn from the feed end of the tank, the rate of introduction and withdrawal of the ethylene dichloride and the peat being proportioned to the amount of peat being passed through the ethylene dichloride so that the desired concentration of extracted material is reached at the time of withdrawal. As will be apparent to those skilled in the extraction art, the solution should not be permitted to become so concentrated as to produce unsatisfactory extraction.

From the standpoint of the size of the peat raw material being treated, it has been found preferable, but not essential, to break up or pulverize the peat prior to introducing it into the ethylene dichloride tanks in those instances where the raw peat has been compressed during the mining or shipping operations. Treatment of crushed or pulverized peat with ethylene dichloride at atmospheric temperatures and pressures as above defined, and within treating times of about 2 to 3 hours, enables the production of excellent peat briquettes of sizes up to and including six inch cubes and rectangular cubes of six by four by two inches in dimension. These have been found to be particularly useful as industrial and commercial fuels.

In general, the longer extraction periods, somewhat over 3 hours to about 4 hours, are employed where treating peat at temperatures below freezing, and the shorter periods, for example, 2 hours or less, have been found satisfactory where treating under summer heats, for example, are around 90 deg. F. to 100 deg. F.

When the treated peat is to be removed from the solution of the extracts in ethylene dichloride, as much of the ethylene dichloride solution is removed as possible by any convenient operation. Thus, if a strictly batch treatment is employed, and the solution is drained from the peat, an adequate time will be allowed for drainage of the solution out of the tank, and, preferably, auxiliary means, such as centrifuging, are employed. Where the peat being treated is carried through the ethylene dichloride bath by mechanical conveyors, whether by countercurrent flow of ethylene dichloride or otherwise, the peat will be allowed to drain adequately and should then be passed to centrifuges, for removal of all excess liquid ethylene dichloride possible. The recovery of the maximum amount of the ethylene dichloride from the amorphous peat is economically important since, without centrifuging or equivalent separating means, there would be a high percentage loss of the solvent.

The ethylene dichloride solution which has been removed from the peat by centrifuging and, therefore, containing all the constituents extracted from the peat, is then passed to an appropriate still heated to 185° F., the boiling point of ethylene dichloride, in order that the ethylene dichloride may be recovered and reused.

However, the ethylene dichloride solution sometimes contains extracted fractions from the peat, the distillation temperatures of which are so close to the distillation temperature of ethylene dichloride at atmospheric pressure that, when desired to recover these fractions, fractional distillation should be employed. Such distillation may be effected at the time of removal of the solvent from the resins and other residue-forming materials, or the solvent including the desired low boiling extracted fractions may be first distilled off from the resins and other residue-forming materials, and then fractionated.

The ethylene dichloride distilled from the extracted fractions represented by the resins and other extracted materials is recovered by condensation for further use in treating fresh peat.

The resinous residues can be separated as hereinafter disclosed and recovered upon removal of the ethylene dichloride in a solid to a semi-solid condition and may be used without further treatment in the preparation of paints or varnishes, or in connection with the plastic industries, or for any other purposes to which resinous and waxy materials are adaptable, or, they may be further refined or decolorized for appropriate uses. Alternatively, these resinous bottoms may be fractionated into their various constituents for various purposes. The first separation stage may be effected at atmospheric temperatures and pressures by selective solvent extraction and precipitation. The leached products can be fractionated by distillation without previously separating the resin from waxes and oils, as shown in the table. Thus, according to one method of separation, one part by weight of the resinous bottoms recovered upon distilling off the ethylene dichloride, is dissolved in one part by weight of lean ethylene dichloride, and two parts by weight of 95% ethyl alcohol, or denatured ethyl alcohol, are added to the ethylene dichloride solution, whereupon certain of the resins are precipitated out. In another method of separation, the ethylene dichloride is distilled until the still bottoms contain approximately 50% of ethlyene dichloride (approximately 1.66 specific gravity at 60° F.). Then about two parts by weight of denatured alcohol are added for each part of ethylene dichloride by weight. Other anti-solvents such as methyl alcohol, propyl alcohol and isopropyl alcohol may be substituted for the above mentioned alcohol.

After precipitation has been completed, the precipitated resins and associated materials are settled and separately recovered. The precipitate may then be used as a resinous product for paints and varnishes and other purposes as above indicated, or otherwise, or it may be fractionated by heat, that is, fractionally distilled.

The supernatant liquid separated from the precipitate produced by the addition of ethyl or other alcohol as above described, is then distilled to remove the ethylene dichloride solvent and the alcohol, their separation being fractional. Separated lean ethylene dichloride may then be passed to storage with the other recovered ethylene dichloride separated from the treated peat, and the alcohol returned to storage to be used for further precipitation of resins.

The bottoms remaining following removal of the ethylene dichloride and the ethyl alcohol are oils and waxes, and they may be further separated into fractions by vacuum distillation.

EXAMPLES

In a specific instance, using a peat occurring naturally in Pennsylvania, immersion of the peat at about 70° F. in ethylene dichloride at a temperature of about 70° F. was maintained for about two hours, whereupon the ethylene dichloride solution was recovered by centrifuging and passed to another tank for similar immersion of another batch. Several similar quantities of peat were treated with the same ethylene dichloride solution. Commonly such treatment is continued until the ethylene dichloride contains from about 20% to about 35% of resinous, waxy, oily and similar materials extracted from the peat.

As another example of extracting peat obtained from Great Britain, a quantity of peat was placed in a tank and submerged in ethylene dichloride which was continuously recirculated by drawing from the bottom and returning at the top. Here, the operating temperature ranged between about 40° F. and about 50° F., and the treatment was continued for approximately three hours. The solution was then drawn off, and the peat given a brief rinse with lean ethylene dichloride to wash off excess resinous material on the surface thereof.

For the purpose of this invention, all extraction requirements with the ethylene dichloride are met when extracting within the above stated time and temperature ranges at atmospheric pressures and temperatures, this being the result of the unexpected discovery that ethylene dichloride is the only solvent satisfactory for these purposes and conditions.

Table.—*Products obtained by fractional distillation from leached peat by ethylene dichloride*

*Waxes.*—Fraction 1; Refractive Index 1.513.
*Montan wax.*—Fraction 2; Refractive Index 1.519.
*Resins.*—Fraction 3; Refractive Index 1.516.

Additional products may be obtained from the remaining pitch by cracking.

In the preferred form of the invention the resins are not separated before making the above refraction recovery; that is, the leached out material is fractionated without first separately recovering the resin. It has been found that this can be done to great advantage in the case of a peat containing a high percentage of resin.

I claim:
1. A process for forming peat briquettes which comprises leaching pulverized peat containing resinous and other soluble constitutents by immersing said peat in ethylene dichloride solvent at atmospheric temperature and pressure ranges from a period of time between about two and three hours to remove the soluble oil, wax and resinous constituents therefrom, separating the insoluble, treated peat from the solvent, recovering said constituents from said solvent, and compressing said dried peat into briquette form.

2. A process for forming peat briquettes which comprises leaching pulverized peat containing resinous and other soluble constituents by immersing said peat in ethylene dichloride solvent at atmospheric temperature and pressure ranges from a period of time between two and three hours to remove the soluble oil, wax and resinous constituents therefrom, separating the insoluble, treated peat from the solvent, recovering said constituents from said solvent, and compressing said dried peat into briquette form of a size equal up to the volume occupied by a six inch cube.

References Cited in the file of this patent

UNITED STATES PATENTS

| Number | Name | Date |
|---|---|---|
| 1,143,319 | Rigby | June 15, 1915 |
| 1,473,641 | Pohl | Nov. 13, 1923 |
| 1,501,101 | Dow | July 15, 1924 |
| 2,453,543 | Schabelitz | Nov. 9, 1948 |

FOREIGN PATENTS

| Number | Country | Date |
|---|---|---|
| 481,108 | Great Britain | Feb. 28, 1938 |

OTHER REFERENCES

"Chemistry of Coal Utilization," vol. I, Lowry, John Wiley and Sons, N. Y., 1945, pp. 679–690. (Copy in Div. 25.)

"Industrial Solvents," Mellan-Reinhold Pub. Corp., N. Y., 1939, p. 163. (Copy in Div. 64.)